(12) United States Patent
Wang et al.

(10) Patent No.: US 9,846,436 B2
(45) Date of Patent: Dec. 19, 2017

(54) FLIGHT MONITORING SYSTEM AND METHOD FOR MONITORING FLIGHT OF UNMANNED AERIAL VEHICLE

(71) Applicant: ZEROTECH (SHENZHEN) INTELLIGENCE ROBOT CO. LTD., Guangdong (CN)

(72) Inventors: Shuaiqin Wang, Beijing (CN); Lun Wang, Beijing (CN); Lin Yang, Beijing (CN); Jianjun Yang, Beijing (CN)

(73) Assignee: Zerotech (Shenzhen) Intelligence Robot Co. LTD., Guangdong (CN)

( * ) Notice: Subject to any disclaimer, the term of this patent is extended or adjusted under 35 U.S.C. 154(b) by 0 days.

(21) Appl. No.: 15/300,952

(22) Filed: Sep. 30, 2016

(65) Prior Publication Data

US 2017/0045892 A1 Feb. 16, 2017

Related U.S. Application Data

(63) Continuation-in-part of application No. 15/129,928, filed on Sep. 28, 2016, which is a continuation-in-part
(Continued)

(30) Foreign Application Priority Data

Apr. 22, 2014 (CN) ..................... 2014 2 0197623 U

(51) Int. Cl.
*G01C 23/00* (2006.01)
*G05D 1/08* (2006.01)
(Continued)

(52) U.S. Cl.
CPC ........... *G05D 1/0808* (2013.01); *B64C 39/02* (2013.01); *B64C 39/024* (2013.01);
(Continued)

(58) Field of Classification Search
CPC .............................. G05D 1/0808; B64C 39/02
(Continued)

(56) References Cited

U.S. PATENT DOCUMENTS

2010/0198514 A1* 8/2010 Miralles ................. F41G 7/008
701/302
2014/0032034 A1* 1/2014 Raptopoulos ........ G08G 5/0069
701/25

FOREIGN PATENT DOCUMENTS

CN 101515178 A 8/2009
CN 202583865 U 12/2012
(Continued)

OTHER PUBLICATIONS

International Search Report, dated Jul. 6, 2015 (PCT/CN2015/077086).

*Primary Examiner* — Muhammad Shafi
(74) *Attorney, Agent, or Firm* — Robert L. Stearns; Dickinson Wright, PLLC

(57) ABSTRACT

A flight monitoring system comprises a first set of flight-status detecting sensors comprising a first-type sensor A1 for providing a first-type measurement result and a second-type sensor A2 for providing a second-type measurement result; a second set of flight-status detecting sensors comprising a first-type sensor B1 for providing a first-type measurement result and a second-type sensor B2 for providing a second-type measurement result. The flight monitoring system further comprises a control module configured to perform: comparing a difference between the first-type measurement results from the first-type sensors A1 and B1 with a first predetermined threshold; if the difference is more than the first predetermined threshold, deciding a first-type sensor data of the first-type sensors as indefinite; and determining a value of the first-type sensor data by selecting one of the first-type measurement results from the first-type sensors A1
(Continued)

and B1 as the value of the first-type sensor data according to the second-type measurement results, and setting the first-type sensor data as definite after the selection.

20 Claims, 6 Drawing Sheets

Related U.S. Application Data of application No. PCT/CN2015/077086, filed on Apr. 21, 2015.

(51) Int. Cl.
  *G05D 1/10* (2006.01)
  *B64C 39/02* (2006.01)
  *G05D 1/00* (2006.01)

(52) U.S. Cl.
  CPC .............. *G05D 1/0077* (2013.01); *G05D 1/10* (2013.01); *B64C 2201/141* (2013.01)

(58) Field of Classification Search
  USPC ..... 701/3, 30.2–31.1, 501; 340/856.3, 856.2, 340/426.24, 426.5, 539.22, 539.26, 545.2, 340/615, 619, 621, 622, 623; 342/357.65; 801/30.2–31.1, 501
  See application file for complete search history.

(56) References Cited

FOREIGN PATENT DOCUMENTS

| | | |
|---|---|---|
| CN | 102915038 A | 2/2013 |
| CN | 103529692 A | 1/2014 |
| CN | 203786564 U | 8/2014 |
| EP | 2381322 A2 | 10/2011 |

\* cited by examiner

FLIGHT MONITORING SYSTEM AND METHOD FOR MONITORING FLIGHT OF UNMANNED AERIAL VEHICLE

CROSS REFERENCE TO RELATED APPLICATIONS

This is a continuation-in-part application of International Application No. PCT/CN2015/077086 filed on Apr. 21, 2015 and U.S. Utility application Ser. No. 15/129,928 filed on Sep. 28, 2016, both of which claim priority to Chinese Patent Application No, 201420197623.8 filed on Apr. 22, 2014, the entire content of each which are incorporated herein by reference.

BACKGROUND OF THE INVENTION

1. Technical Field

The present application relates generally to unmanned aerial vehicles, and more particularly to a flight monitoring and control system for unmanned aerial vehicles (UAVs).

2. Related Art

A flight control system, which is an important component for an aircraft such as an unmanned aerial vehicle (UAV), can be equipped with certain flight control algorithm to control the flight of the aircraft. For example, the flight control system may collect certain parameters of flight status, calculate navigation paths, control the flight, diagnose and handle malfunctions and emergencies, and etc.

In the prior art, if the UAV has only one set of sensors, it is vulnerable to sensor failure caused by external interference or internal malfunctions, and thus is not a robust system.

In order for improved flight control, some UAVs use a triple-redundancy flight control system. Such flight control system has three sets of flight-status detecting sensors which can monitor the flight status of the UAV independently. When one of the three sets of sensors has any failure(s), the other two sets can still work properly to provide flight-status measurement results, thereby improving the reliability of the system. However, the triple-redundancy flight control system requires more UAV space and complicated designs, thus increases the weight, size and cost of the UAV.

SUMMARY

An objective of the present application is to provide a flight monitoring system which has a simplified structure and high reliability. In particular, the proposed solution uses two set of various sensors. It explores some common parameters (e.g., velocity) detected by various sensors directly or indirectly, and by exploiting such common parameters, certain sensor data can be verified by making reference to other type of sensor data.

In a first aspect of the present application, there is disclosed a flight monitoring system for an unmanned aerial vehicle. The flight monitoring system comprises a first set of flight-status detecting sensors (A1, A2, . . . ) comprising a first-type sensor A1 for providing a first-type measurement result and a second-type sensor A2 for providing a second-type measurement result; a second set of flight-status detecting sensors (B1, B2, . . . ) comprising a first-type sensor B1 for providing a first-type measurement result and a second-type sensor B2 for providing a second-type measurement result. The flight monitoring system further comprises a control module coupled to the first and second sets of flight-status detecting sensors to receive the measurement results therefrom, wherein the control module is configured to perform the following operations: comparing a difference between the first-type measurement results from the first-type sensor A1 and the first-type sensor B1 with a first predetermined threshold; if the difference is more than the first predetermined threshold, deciding a first-type sensor data of the first-type sensors as indefinite; and determining a value of the first-type sensor data by selecting one of the first-type measurement results from the first-type sensor A1 and the first-type sensor B1 as the value of the first-type sensor data according to the second-type measurement results, and setting the first-type sensor data as definite after the selection.

In a second aspect of the present application, there is disclosed a method for monitoring flight of an unmanned aerial vehicle (UAV). The method comprises: detecting a flight status of the UAV using a first set of flight-status detecting sensors (A1, A2, . . . ) comprising a first-type sensor A1 and a second-type sensor A2, wherein the first-type sensor A1 provides a first-type measurement result and the second-type sensor A2 provides a second-type measurement result; detecting the flight status of the UAV using a second set of flight-status detecting sensors (B1, B2, . . . ) comprising a first-type sensor B1 and a second-type sensor B2, wherein the first-type sensor B1 provides a first-type measurement result and the second-type sensor B2 provides a second-type measurement result; comparing a difference between the first-type measurement results from the first-type sensor A1 and the first-type sensor B1 with a first predetermined threshold; if the difference is more than the first predetermined threshold, deciding a first-type sensor data of the first-type sensors as indefinite; and determining a value of the first-type sensor data by selecting one of the first-type measurement results from the first-type sensor A1 and the first-type sensor B1 as the value of the first-type sensor data according to the second-type measurement results, and setting the first-type sensor data as definite after the selection.

In a third aspect of the present application, there is disclosed a method for monitoring flight of an unmanned aerial vehicle (UAV). The method comprises: detecting a flight status of the UAV using a first set of flight-status detecting sensors comprising a first inertial measurement sensor A1, a first barometer A2, a first positioning sensor A3 and a first magnetic compass A4; detecting the flight status of the UAV using a second set of flight-status detecting sensors comprising a second inertial measurement sensor B1, a second barometer B2, a second positioning sensor B3 and a second magnetic compass B4; identifying whether a sensor data of each type of flight-status detecting sensors is definite; determining a value of the sensor data of a type of flight-status detecting sensors using the sensor data of at least one another type of flight-status detecting sensors; and setting the sensor data of the type of flight-status detecting sensors as definite after the determination.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

Figure 1:
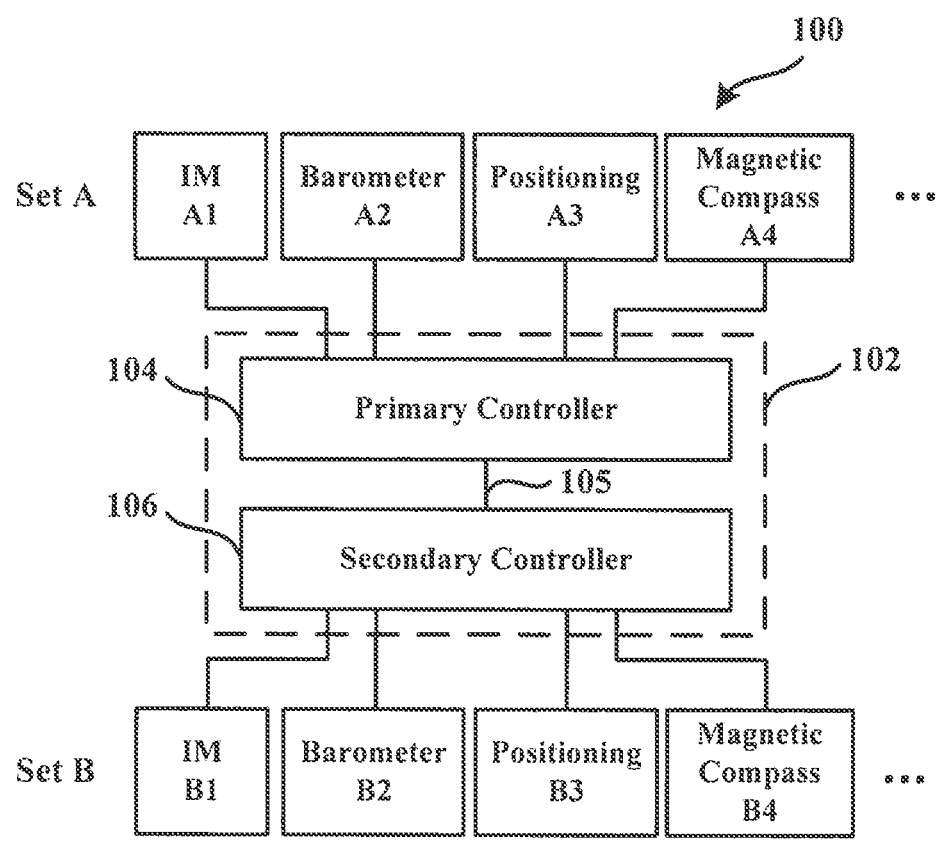
FIG. 1 shows a block diagram of a flight monitoring system 100 according to an embodiment of the present application.

FIG. 1 shows an exemplary flight monitoring system 100 according to an embodiment of the present application. The flight monitoring system 100 can be used by an unmanned aerial vehicle (UAV) and as a part of a flight control system of the UAV.

As shown in FIG. 1, the flight monitoring system 100 includes a first set of flight-status detecting sensors (Set A) and a second set of flight-status detecting sensors (Set B). In other words, the flight monitoring system 100 is a dual-redundancy system. Compared with conventional triple-redundancy systems, such dual-redundancy system is simple in structure as only two sets of flight-status detecting sensors are included in the system.

Specifically, each set of flight-status detecting sensors may include various types of sensors, which monitor respective aspects of the flight status of the UAV and generate respective types of measurement results. In the embodiment shown in FIG. 1, the first set of sensors may include a first inertial measurement (IM) sensor A1, a first barometer A2, a first positioning sensor A3 and a first magnetic compass A4. Similarly, the second set of flight-status detecting sensors may include a second inertial measurement sensor B1, a second barometer B2, a second positioning sensor B3 and a second magnetic compass B4. In other words, both sets of flight-status detecting sensors include at least two sensors of the same types. For example, the first IM sensor A1 and the second IM sensor B1 are of the same type, and the first barometer A2 and the second barometer B2 are of the same type. It can be readily appreciated that one or both sets of sensors may include other type(s) of sensors suitable for detecting other aspect(s) of the flight-status of the UAV, e.g. ultrasound sensors or optical flow sensors. In some embodiments, the IM sensors A1 and B1 may be accelerometers and/or gyroscopes, and the positioning sensors A3 and B3 may be Global Positioning System (GPS) sensors.

The flight monitoring system 100 further includes a control module 102 which is used to collect the measurement results from the first and second sets of flight-status detecting sensors (A1, A2, A3, A4, . . . and B1, B2, B3, B4, . . . ), and to process such measurement results using certain algorithm(s). After being processed by the control module 102, the measurement results can be used for flight control of the UAV, e.g., for adjusting the flight path or determining malfunction or failure of certain UAV component(s). In the embodiment shown in FIG. 1, the control module 102 includes a primary controller 104 and a secondary controller 106.

The primary controller 104 is coupled to the first set of sensors (A1, A2, A3, A4 . . . ), while the secondary controller 106 is coupled to the second set of sensors (B1, B2, B3, B4 . . . ). The primary controller 104 may be further coupled to the secondary controller 106 through a data/signal bus 105, such that data, instructions and/or signals can be communicated between the two controllers 104 and 106. In some embodiments, the primary controller 104 and the secondary controller 106 may have the same or similar circuit structure and/or functionalities. In some other embodiments, the primary controller 104 may have more functionality than the secondary controller 106. For example, the secondary controller 106 can be used to receive the measurement results from the second set of sensors and deliver them to the primary controller 104 for processing. It can be readily appreciated that the division of the sub-modules of the control module 102 in FIG. 1 is exemplary from the functional perspective, and such division is not mandatory. In an alternative embodiment, the features and functionalities of the primary controller 104 and the secondary controller 106 may be embodied in a single control unit.

The two sets of sensors provide two sets of measurement results indicative of the flight status of the UAV, which significantly improves the reliability of the flight monitoring system 100. For example, if the measurement result provided by any one of the two sets of sensors is invalid due to an unexpected failure or defect, the measurement result provided by a counterpart sensor of the same type may be selected and used by the control module 102.

Validity Check of Sensor Data

The control module 102 may determine the validity of the measurement results received from the sensors, and further determine which measurement result can be used for the flight control of the UAV. In some embodiments, the primary controller 104 is used to determine the validity of the measurement results from the first set of sensors, and the secondary controller 106 is used to determine the validity of the measurement results from the second set of sensors.

Furthermore, the primary controller 104 and the secondary controller 106 may communicate with each other regarding the validity determination of the measurement results from the two sets of sensors. For example, the primary controller 104 may receive the validity determination results from the secondary controller 106, or vice versa. In this way, the controller which gets all the validity determination results may then determine the measurement result(s) from which set of sensors can be used, especially when the measurement results of the same type from the two sets of sensors are both valid. In some other embodiments, the primary controller 104 may determine the validity of the measurement results from both the first and second sets of sensors, wherein the measurement results from the second set of sensors are transmitted to the primary controller 104 immediately after it is collected by the secondary controller 106 without processing.

The control module 102 may determine the validity of the measurement results from various perspectives.

For some types of sensors, their measurement results may incorporate an internal abnormal alert signal indicative of invalidity or low reliability, which can be used to determine the validity of such measurement results. For example, the GPS sensor generates and outputs data even if it is not connected to any GPS satellite, but the data output may include alert data indicating that such data might be incorrect (i.e., invalid) because the GPS is not online, thereby the controller may not use such invalid data for flight control.

For some other types of sensors, the control module 102 may determine the validity of the measurement results by monitoring whether the respective sensors provide their measurement results at an expected or predetermined frequency. Specifically, if the measurement result is generated or provided by the sensor at the expected frequency, or received by the control module 102 at the expected frequency, it can be determined that the measurement result is valid. Otherwise, the measurement result may be determined as invalid by the control module 102.

Further, the control module 102 may use other predetermined standards for determining the validity of the measurement results from the sensors. For example, for a GPS sensor, it adopts a standard that GPS measurement result is valid only when six or more satellites are connected to the GPS sensor and a position dilution of precision (PDOP) index is greater than 1.0. The control module 102 may then compare the received GPS measurement result with the standard, so as to determine whether the GPS measurement result is valid or not. In some examples, specific parameters used in the standard may vary depending on a surrounding environment of the UAV and/or a requirement on sensor accuracy/reliability. For example, in some scenarios which require high reliability, the GPS measurement result is valid only when it meets the highest standard, wherein six or more satellites are connected to the GPS sensor and a PDOP index is greater than 1.0. However, in some other scenarios which require low reliability or have complex surrounding environments, the GPS measurement result may be valid when it meets an intermediate standard, wherein five or more satellites are connected to the GPS sensor and the PDOP index is greater than 3.0. It can be readily appreciated that the above standards for determination of validity of measurement results are exemplary and not mandatory. In practice, various standards can be used for different types of flight-status detecting sensors, which can be stored within the control module 102 or accessible by the control module 102.

In operation, the control module 102 may determine the validity of the measurement results from two sensors of the same type, so as to determine whether or not to use one of the measurement results as sensor data of the sensors of such type. For example, the control module 102 may determine the validity of a first IM measurement result from the IM sensor A1, as well as the validity of a second measurement result from the IM sensor B1. If it is determined that none of the two IM measurement results is valid, then the control module 102 may generate a control signal indicating that the IM sensor data is invalid. On the contrary, if it is determined that one of the two IM measurement results from the IM sensors A1 and B1 is valid and the other is invalid, the control module 102 may use the valid IM measurement result as the IM sensor data.

Definite Check of Sensor Data

However, in some situations, the control module 102 may determine that the IM measurement results from the IM sensors A1 and B1 are both valid, or determine that the measurement results from another two sensors of the same type are both valid. The application successfully provides a method for determining the sensor data according to the two valid measurement results in such situations.

Figure 2:
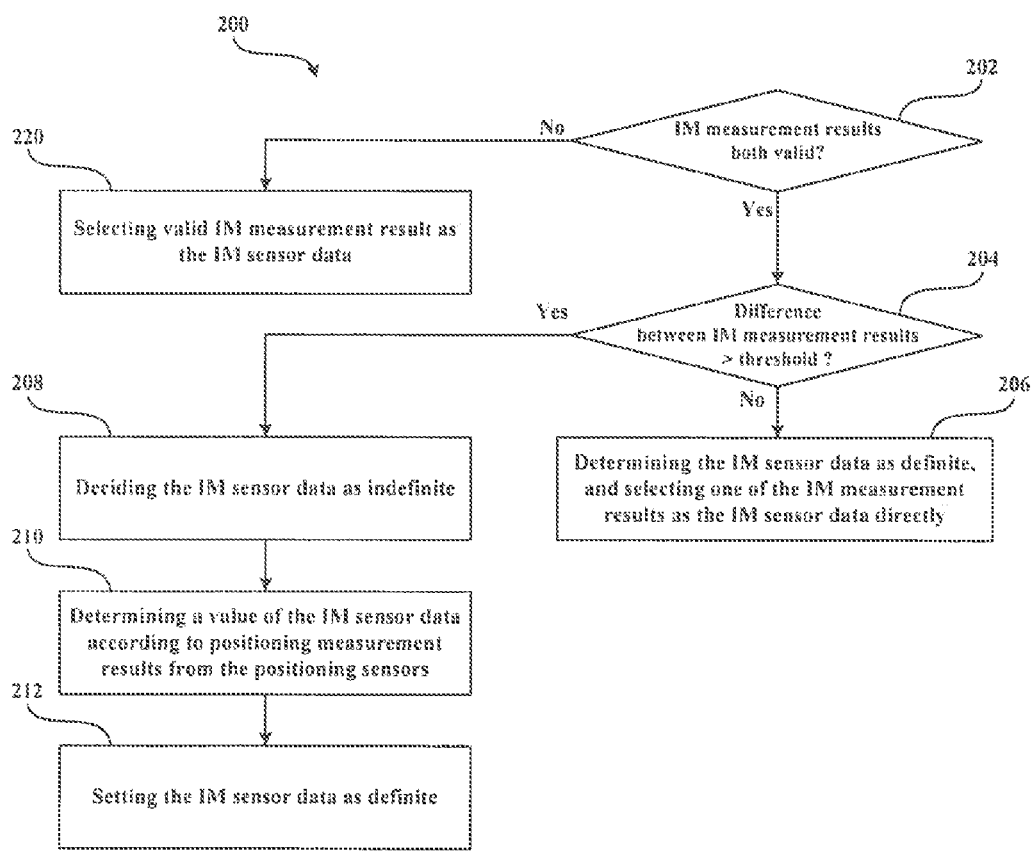
FIG. 2 shows a flow chart of a method 200 for monitoring flight of a UAV according to an embodiment of the present application.

FIG. 2 shows a method 200 for monitoring flight of an unmanned aerial vehicle (UAV) according to an embodiment of the present application. The method can be used to resolve the above problem of how to identify one of two valid measurement results from two sensors of the same type. The method can be implemented with the UAV flight monitoring system 100 shown in FIG. 1. Hereinafter, the method will be elaborated with more details with reference to FIGS. 1 and 2.

Specifically, as mentioned above, the flight monitoring system 100 includes the IM sensor A1 for providing the first IM measurement result, and the IM sensor B1 for providing the second IM measurement result. Moreover, the flight monitoring system 100 also includes the positioning sensor A3 for providing the first positioning measurement result, and the positioning sensor B3 for providing the second positioning measurement result.

As shown in FIG. 2, in step 202, the control module 102 determines whether the two IM measurement results from the IM sensors A1 and B1 are both valid. If one is valid and the other one is invalid, the control module 102 may select the valid IM measurement result as the IM sensor data in step 220.

If both are valid, then in step 204, the two IM measurement results are compared with each other to determine if their difference is equal to or less than a predetermined threshold. If the difference is equal to or less than the predetermined threshold, it may indicate that the IM measurement results are close and the difference may be caused from internal measurement error(s) which is generally allowable.

As shown in step 206, under such condition, the control module 102 decides that the IM sensor data is definite, and further selects either one of the first and second IM measurement results as the value of the IM sensor data directly, without referring to any other type of sensor data. In some embodiments, by default, the control module 102 may use the first IM measurement result from the first IM sensor A1 as the value of the IM sensor data, especially when the first IM sensor A1 is coupled to the primary controller 104.

The predetermined threshold for comparison with the difference of two measurement results of the same type depends on the specific type of the measurement results. For example, for the measurement results of accelerometers (a type of IM sensor), the threshold may be greater than 0.03 m/s$^2$, or preferably 0.05 m/s$^2$. For the measurement results of gyroscopes (another type of IM sensor), the threshold may be greater than 15 degree/s, or preferably 20 degree/s. For the measurement results of barometers, the threshold may be greater than 30 cm, or preferably 1 meter. For the measurement results of magnetic compasses, the threshold may be greater than 5 degrees, or preferably 15 degrees. For the measurement results of GPS positioning sensors, the threshold may be greater than 10 meters or preferably 20 meters (for horizontal position), or be greater than 0.3 m/s or preferably 0.5 m/s (for speed).

However, in step 204, if it is determined that the difference between the two IM measurement results is more than the predetermined threshold, it may indicate that the IM measurement results are substantially different from each other and such difference may not be caused from allowable measurement error(s). Under such condition, in step 208, the control module decides that the IM sensor data is indefinite, which needs further clarification process.

The clarification or selection between the two IM measurement results can be based on measurement results from sensors of a different type, e.g. the positioning measurement results from the positioning sensors A3 and B3, because these two types of measurement results contain the same parameters or convertible parameters of the flight status of the UAV. For example, the IM sensors A1 and B1 may measure the acceleration of the UAV, while the positioning sensors A3 and B3 may measure the speed of the UAV. The acceleration of the UAV can be calculated to obtain a speed of the UAV in order for comparison with the speed measured by the positioning sensors A3 and B3. In this way, the positioning measurement results from the positioning sensors A3 and B3 can be used as a reference or basis for selecting the IM measurement results as the IM sensor data.

Specifically, in step 210, the control module determines a value of the IM sensor data by selecting one of the IM measurement results from the IM sensors A1 and B1 as the value of the IM sensor data according to the positioning measurement results from the positioning sensors A3 and B3.

Next, in step 212, the control module may further set the IM sensor data as definite, because its value has been determined in step 210. In some embodiments, one or both of the primary controller and the secondary controller of the control module can implement the above process shown in FIG. 2.

In some embodiments, at least one of the positioning measurement results provided by the positioning sensor A3 and B3 is valid, and the valid positioning measurement result(s) can be used as the basis or reference for determination of the IM sensor data. However, in some conditions, the positioning measurement results from the positioning sensors A3 and B3 may substantially differ from each other, e.g. have a difference more than a second predetermined threshold. Thus, the positioning measurement results cannot be used to determine the IM sensor data directly. Under such condition, the control module may first determine a value of the positioning sensor data out of the two positioning measurement results. After the determination, the control module 102 may then use the positioning sensor data for further selection of one of the IM measurement results as the value of the IM sensor data.

In some alternative embodiments, when the positioning sensor data is indefinite and cannot be used as the reference for determination of the IM sensor data, another type of sensor data such as the barometer sensor data of the barometers A2 and B2 or the magnetic compass sensor data of the magnetic compasses A4 and B4 may be used alternatively as the reference.

It should be noted that the method shown in FIG. 2 exemplarily illustrates the determination of the IM sensor data, and in some other examples, the method can be used for determination of the positioning sensor data, the barometer sensor data, the magnetic compass sensor data or any other types of sensor data that may be used in flight monitoring systems of the UAVs.

Definiteness Check by Making Reference to Other Sensor Data

Figure 3:
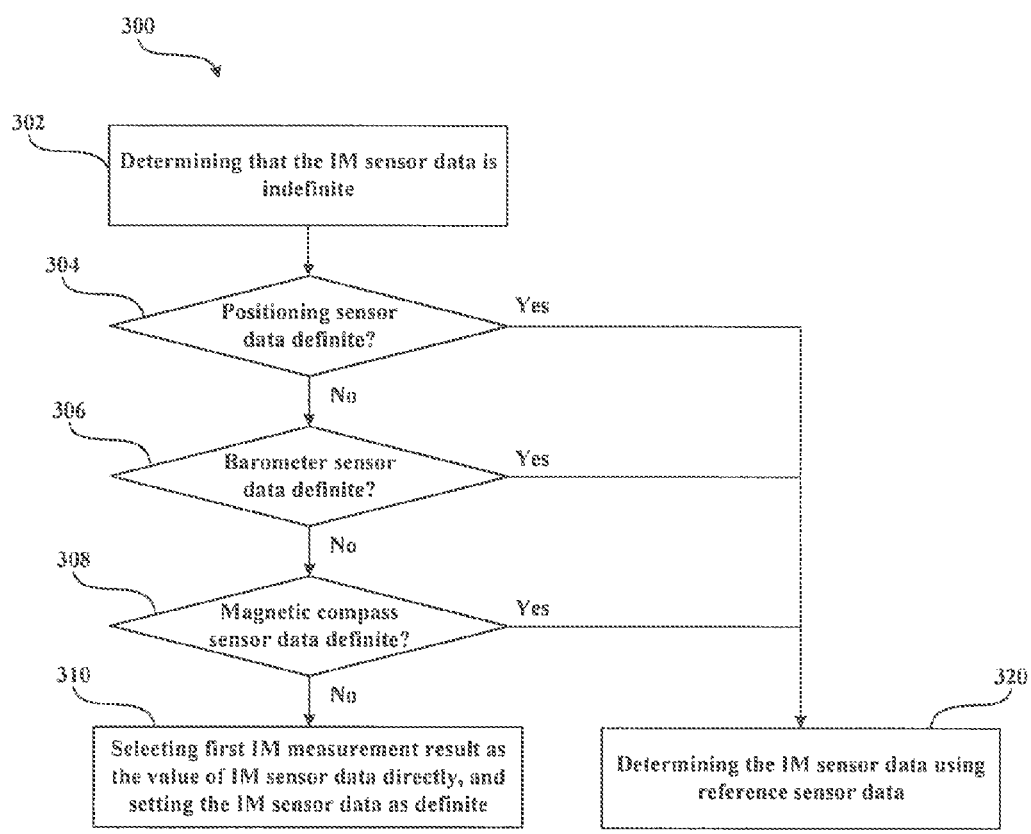
FIG. 3 shows a process for determination of the IM sensor data using several other types of sensor data.

FIG. 3 shows a process for determination of the IM sensor data using several other types of sensor data.

As shown in FIG. 3, in step 302, the control module determines that the IM sensor data is indefinite, e.g., using steps 204 and 208 shown in FIG. 2.

Accordingly, in step 304, the control module determines whether the positioning sensor data is definite. If yes, the control module uses the positioning sensor data as the reference for determination of the IM sensor data, as is shown in step 320.

If not, in step 306, the control module further determines whether the barometer sensor data is definite. If the barometer sensor data is definite, the control module may use it as the reference.

If the barometer sensor data is indefinite, in step 308, the control module further determines whether the magnetic compass sensor data is definite. If the magnetic compass sensor data is definite, the control module may use it as the reference.

If the magnetic compass sensor data is indefinite, in step 310, by default, the control module further selects the first IM measurement result from the IM sensor A1 as the value of the IM sensor data directly, without referring to any other type of sensor data, and sets the IM sensor data as definite. In this way, the IM sensor data can be determined.

In other words, in order for determination of the IM sensor data, the sensor data of the positioning sensors may be used if it is definite. If the sensor data of the positioning sensors is indefinite and the sensor data of the barometers is definite, the sensor data of the barometers may be used. Furthermore, if the sensor data of the positioning sensors and the barometers is indefinite but the sensor data of the magnetic compass is definite, the sensor data of the magnetic compass may be used.

Specifically, in steps 304 and 320, if the positioning sensor data is selected as the reference for determination of the IM sensor data, a first velocity is calculated from the first IM measurement result of the first IM sensor A1, and a second velocity is calculated from the second IM measurement result of the second IM sensor B1. Furthermore, a reference velocity may be calculated from the positioning sensor data, i.e. from one of the positioning measurement results. Next, the first velocity is compared to the reference velocity to obtain a first difference, and the second velocity is compared to the reference velocity to obtain a second difference. These two differences may be further compared with a predetermined reference threshold, e.g. 0.3 m/s or preferably 0.5 m/s. If the first difference is smaller than the reference threshold, the first IM measurement result is selected. Otherwise, if the first difference is greater than the reference threshold and the second difference is smaller than the reference threshold, the second IM measurement result is selected. Or, if both the first and second differences are bigger than the reference threshold, by default, the first IM measurement result may be used as the value of the IM sensor data for flight control of the UAV. In other words, unless the first difference is greater than the reference threshold and the second difference is smaller than the reference threshold, the first IM measurement result is used as the value of the IM sensor data.

Furthermore, in steps 306 and 320, if the barometer sensor data is selected as the reference for determination of the IM sensor data, a first vertical speed is calculated from the first IM measurement result of the first IM sensor A1, and a second vertical speed is calculated from the second IM measurement result of the second IM sensor B1. Furthermore, a reference vertical speed may be calculated from the barometer sensor data, i.e. from one of the barometer measurement results which is decided as definite barometer data. Next, the first vertical speed is compared to the reference vertical speed to obtain a first difference, and the second vertical speed is compared to the reference vertical speed to obtain a second difference. These two differences may be further compared with a predetermined reference threshold, e.g. 0.3 m/s or preferably 0.5 m/s. If the first difference is smaller than the reference threshold, the first IM measurement result is selected. Otherwise, if the first difference is greater than the reference threshold and the second difference is smaller than the reference threshold, the second IM measurement result is selected. Or, if both the first and second differences are bigger than the reference threshold, by default, the first IM measurement result may be used as the value of the IM sensor data for flight control of the UAV. In other words, unless the first difference is greater than the reference threshold and the second difference is smaller than the reference threshold, the first IM measurement result may be used as the value of the IM sensor data for flight control of the UAV.

Still further, in steps 308 and 320, if the magnetic compass sensor data is selected as the reference for determination of the IM sensor data, a first azimuth (e.g. pitch, roll, or yaw) is calculated from the first IM measurement result of the first IM sensor A1, and a second azimuth is calculated from the second IM measurement result of the second IM sensor B1. Furthermore, a reference azimuth may be calculated from the magnetic compass sensor data, i.e. from one of the magnetic compass measurement results which is decided as definite compass data. Next, the first azimuth is compared to the reference azimuth to obtain a first difference, and the second azimuth is compared to the reference azimuth to obtain a second difference. These two differences may be further compared with a predetermined reference threshold, e.g. 5 degrees or preferably 15 degrees. If the first difference is smaller than the reference threshold, the first IM measurement result is selected. Otherwise, if the first difference is greater than the reference threshold and the second difference is smaller than the reference threshold, the second IM measurement result is selected. Or, if both the first and second differences are bigger than the reference threshold, by default, the first IM measurement result may be used as the value of the IM sensor data for flight control of the UAV. In other words, unless the first difference is greater than the reference threshold and the second difference is smaller than the reference threshold, the first IM measurement result may be used as the value of the IM sensor data for flight control of the UAV.

In this way, the IM sensor data which is previously determined as indefinite can be provided with a definite value, and such value is relatively reliable because the determination involves other types of sensor data which are definite. Thus, the reliability of the flight monitoring system can be improved.

It should be understood that FIG. 3 is an illustration only. For example, steps 304, 306 and 308 may be conducted in a different order. Also, it should be understood that steps 304, 306 and 308 can be conducted individually and separately, which could be a variant of the embodiment of FIG. 3.

Figure 4:
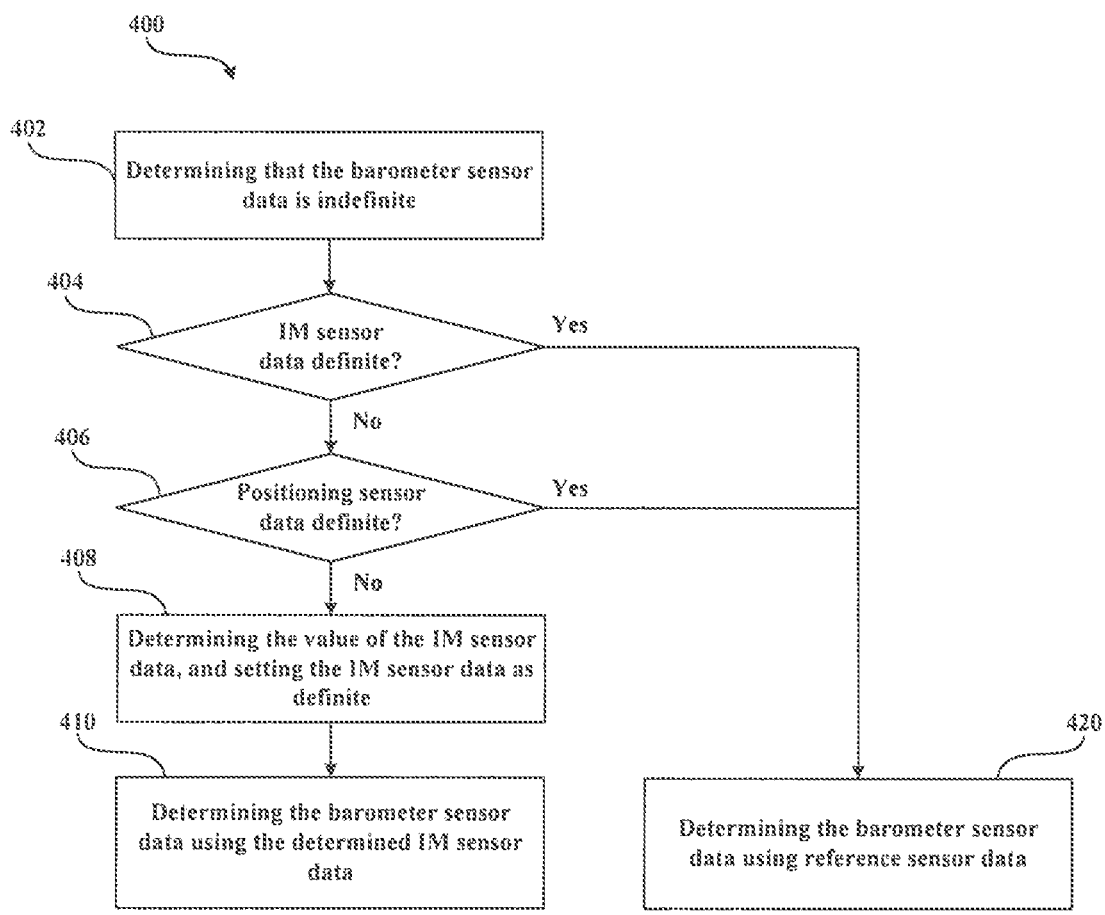
FIG. 4 shows a process for determination of the barometer sensor data using several other types of sensor data.

FIG. 4 shows a process for determination of the barometer sensor data using several other types of sensor data.

As shown in FIG. 4, in step 402, the control module determines that the barometer sensor data is indefinite.

Accordingly, in step 404, the control module determines whether the IM sensor data is definite, e.g., using steps 204 and 208 of FIG. 2, but not including the situation that the IM sensor data is set definite using step 212 of FIG. 2 or the method shown in FIG. 3. If yes, the control module uses the IM sensor data as the reference for determination of the barometer sensor data, as is shown in step 420.

If not, in step 406, the control module further determines whether the positioning sensor data is definite. If the positioning sensor data is definite, the control module may use it as the reference.

In step 408, if the positioning sensor data is indefinite, the control module may further determine the value of the IM sensor data using step 212 of FIG. 2 or the method shown in FIG. 3, and then set the IM sensor data as definite.

Next, in step 410, the control module may use the definite IM sensor data determined in step 408 as the reference.

However, although it is not shown in FIG. 4, if the IM sensor data cannot be determined in step 408 (e.g. both the IM measurement results are invalid), by default, the control module may further select the first barometer measurement result from the first barometer sensor A2 as the value of the barometer sensor data, and then set the barometer sensor data as definite.

In other words, in order for determination of the barometer sensor data, the sensor data of the IM sensors may be used if it is definite. If the sensor data of the IM sensors is indefinite and the sensor data of the positioning sensors is definite, the sensor data of the positioning sensors may be used.

Specifically, in steps 404 and 420, if the IM sensor data is selected as the reference for determination of the barometer sensor data, a first vertical speed is calculated from the first barometer measurement result of the first barometer A2, and a second vertical speed is calculated from the second barometer measurement result of the second barometer B2. Furthermore, a reference vertical speed may be calculated from the IM sensor data, i.e. from one of the IM measurement results. Next, the first vertical speed is compared to the reference vertical speed to obtain a first difference, and the second vertical speed is compared to the reference vertical speed to obtain a second difference. These two differences may be further compared with a predetermined reference threshold, e.g. 0.3 m/s or preferably 0.5 m/s. If the first difference is smaller than the reference threshold, the first barometer measurement result is selected. Otherwise, if the first difference is greater than the reference threshold and the second difference is smaller than the reference threshold, the second barometer measurement result is selected. Or, if both the first and second differences are bigger than the reference threshold, by default, the first barometer measurement result may be used as the value of the barometer sensor data for flight control of the UAV. In other words, unless the first difference is greater than the reference threshold and the second difference is smaller than the reference threshold, the first barometer measurement result may be used as the value of the barometer sensor data for flight control of the UAV.

Furthermore, in steps 406 and 420, if the positioning sensor data is selected as the reference for determination of the barometer sensor data, a first vertical speed is calculated from the first barometer measurement result of the first barometer A2, and a second vertical speed is calculated from the second barometer measurement result of the second barometer B2. Furthermore, a reference vertical speed may be calculated from the positioning sensor data, i.e. from one of the positioning measurement results. Next, the first vertical speed is compared to the reference vertical speed to obtain a first difference, and the second vertical speed is compared to the reference vertical speed to obtain a second difference. These two differences may be further compared with a predetermined reference threshold, e.g. 0.3 m/s or preferably 0.5 m/s. If the first difference is smaller than the reference threshold, the first barometer measurement result is selected. Otherwise, if the first difference is greater than the reference threshold and the second difference is smaller than the reference threshold, the second barometer measurement result is selected. Or, if both the first and second differences are bigger than the reference threshold, by default, the first barometer measurement result may be used as the value of the barometer sensor data for flight control of the UAV. In other words, unless the first difference is greater than the reference threshold and the second difference is smaller than the reference threshold, the first barometer measurement result may be used as the value of the barometer sensor data for flight control of the UAV FIG. 5 shows a process for determination of the positioning sensor data using several other types of sensor data.

Figure 5:
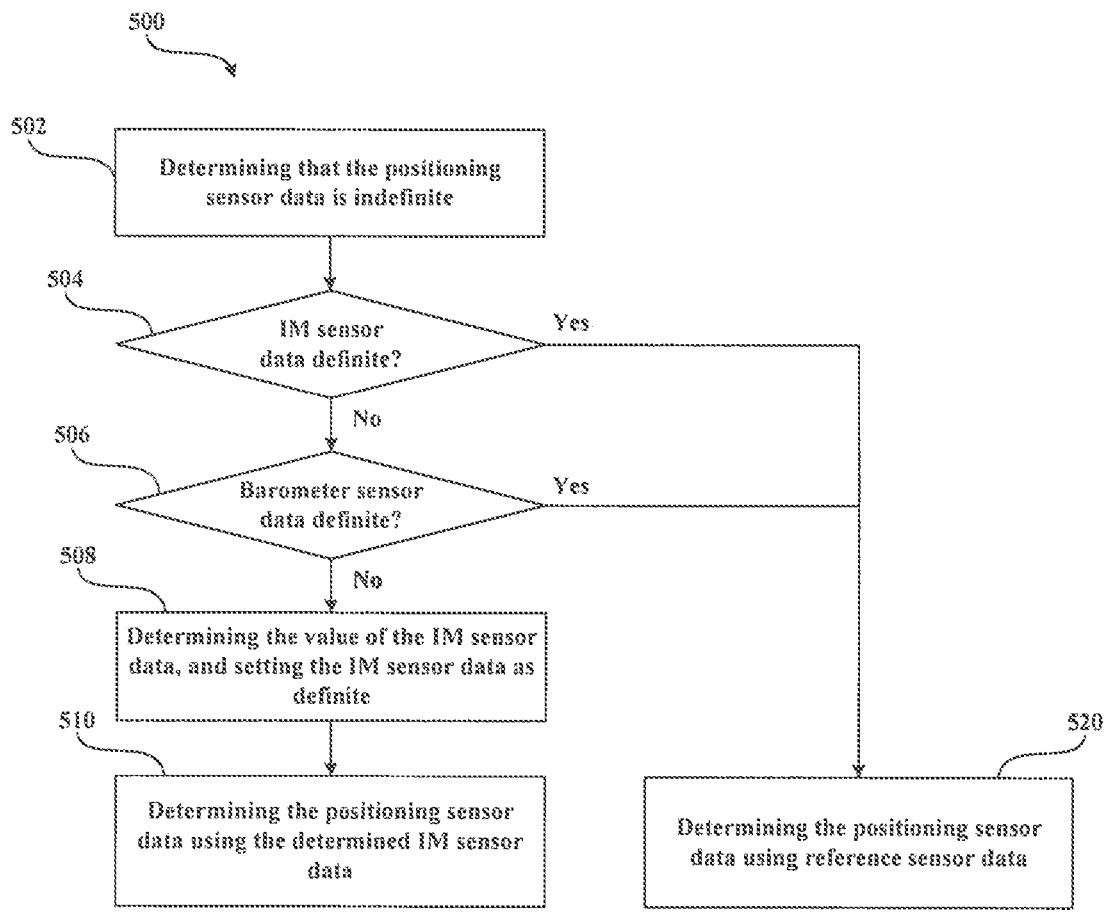
FIG. 5 shows a process for determination of the positioning sensor data using several other types of sensor data.

As shown in FIG. 5, in step 502, the control module determines that the barometer sensor data is indefinite.

Accordingly, in step 504, the control module determines whether the IM sensor data is definite, e.g., using steps 204 and 208 of FIG. 2, but not including the situation that the IM sensor data is set definite using the method shown in step 212 of FIG. 2 or the process of FIG. 3.

If yes, the control module uses the IM sensor data as the reference for determination of the positioning sensor data, as is shown in step 520.

If not, in step 506, the control module further determines whether the barometer sensor data is definite. If the barometer sensor data is definite, the control module may use it as the reference.

If the barometer sensor data is indefinite, in step 508, the control module may further determine the value of the IM sensor data using the method shown in step 212 of FIG. 2 or the method of FIG. 3, and then set the IM sensor data as definite.

Next, in step 510, the control module may use the definite IM sensor data determined in step 508 as the reference.

However, although not shown in FIG. 5, if the IM sensor data cannot determined in step 508, by default, the control module may further select the first positioning measurement result from the first positioning sensor A3 as the value of the positioning sensor data, and then set the positioning sensor data as definite.

In other words, in order for determination of the positioning sensor data, the sensor data of the IM sensors may be used if it is definite. If the sensor data of the IM sensors is indefinite and the sensor data of the barometers sensors is definite, the sensor data of the barometers sensors may be used.

Specifically, in steps 504 and 520, if the IM sensor data is selected as the reference for determination of the positioning sensor data, a first velocity is calculated from the first positioning measurement result of the first positioning sensor A3, and a second velocity is calculated from the second positioning measurement result of the second positioning sensor B3. Furthermore, a reference velocity may be calculated from the IM sensor data, i.e. from one of the IM measurement results. Next, the first velocity is compared to the reference velocity to obtain a first difference, and the second velocity is compared to the reference velocity to obtain a second difference. These two differences may be further compared with a predetermined reference threshold, e.g. 0.3 m/s or preferably 0.5 m/s. If the first difference is smaller than the reference threshold, the first positioning measurement result is selected. Otherwise, if the first difference is greater than the reference threshold and the second difference is smaller than the reference threshold, the second positioning measurement result is selected. Or, if both the first and second differences are bigger than the reference threshold, by default, the first positioning measurement result may be used as the value of the positioning sensor data for flight control of the UAV. In other words, unless the first difference is greater than the reference threshold and the second difference is smaller than the reference threshold, the first positioning measurement result may be used as the value of the positioning sensor data for flight control of the UAV.

Furthermore, in steps 506 and 520, if the barometer sensor data is selected as the reference for determination of the positioning sensor data, a first vertical speed is calculated from the first positioning measurement result of the first positioning sensor A3, and a second vertical speed is calculated from the second positioning measurement result of the second positioning sensor B3. Furthermore, a reference vertical speed may be calculated from the barometer sensor data, i.e. from one of the barometer measurement results. Next, the first vertical speed is compared to the reference vertical speed to obtain a first difference, and the second vertical speed is compared to the reference vertical speed to obtain a second difference. These two differences may be further compared with a predetermined reference threshold, e.g. 0.3 m/s or preferably 0.5 m/s. If the first difference is smaller than the reference threshold, the first positioning measurement result is selected. Otherwise, if the first difference is greater than the reference threshold and the second difference is smaller than the reference threshold, the second positioning measurement result is selected. Or, if both the first and second differences are bigger than the reference threshold, by default, the first positioning measurement result may be used as the value of the positioning sensor data for flight control of the UAV. In other words, unless the first difference is greater than the reference threshold and the second difference is smaller than the reference threshold, the first positioning measurement result may be used as the value of the positioning sensor data for flight control of the UAV FIG. 6 shows a process for determination of the magnetic compass sensor data using another type of sensor data.

Figure 6:
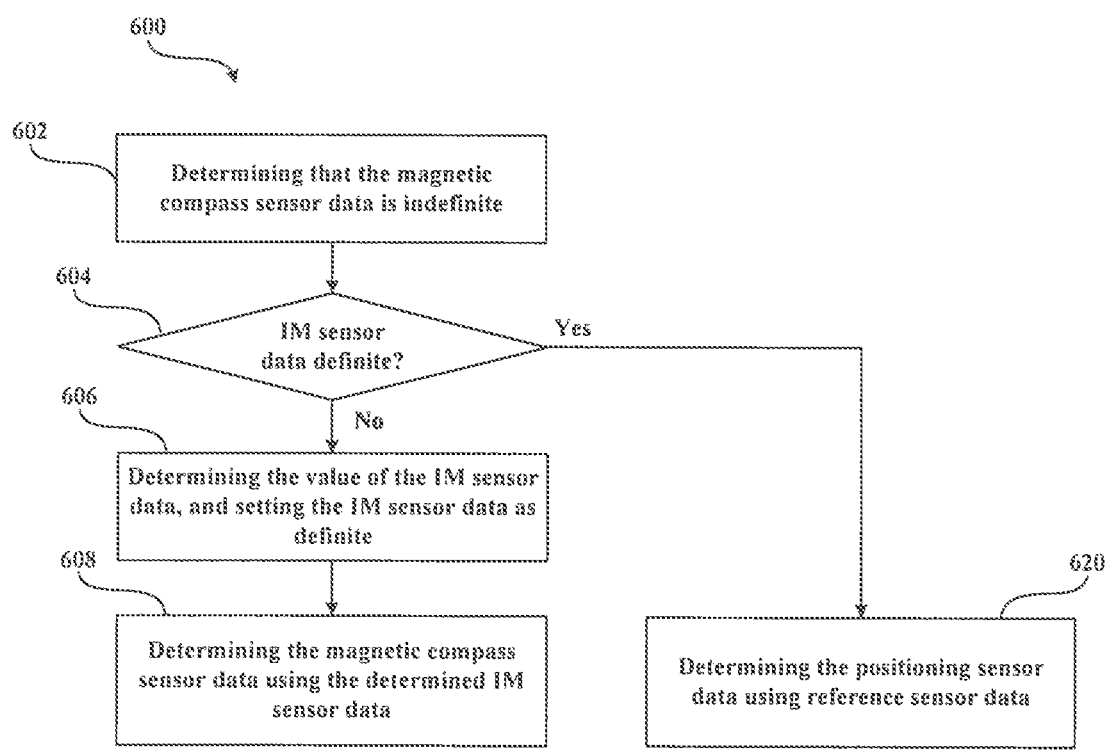
FIG. 6 shows a process for determination of the magnetic compass sensor data using another type of sensor data.

As shown in FIG. 6, in step 602, the control module determines that the magnetic compass sensor data is indefinite.

Accordingly, in step 604, the control module determines whether the IM sensor data is definite, e.g., using steps 204 and 208 of FIG. 2, but not including the situation that the IM sensor data is set definite using step 212 of FIG. 2 or the method shown in FIG. 3. If yes, the control module uses the IM sensor data as the reference for determination of the magnetic compass sensor data, as is shown in step 620.

If not, in step 606, the control module may further determine the value of the IM sensor data using the method shown in step 212 of FIG. 2 or the method shown in FIG. 3, and then set the IM sensor data as definite.

Next, in step 608, the control module may use the definite IM sensor data determined in step 606 as the reference.

However, although not shown in FIG. 6, if the IM sensor data cannot be determined in step 606, by default, the control module may further select the first magnetic compass measurement result from first the magnetic compass A4 as the value of the magnetic compass sensor data, and then set the magnetic compass sensor data as definite.

In other words, in order for determination of the positioning sensor data, the sensor data of the IM sensors may be used if it is definite.

Specifically, in step 608, if the IM sensor data is selected as the reference for determination of the magnetic compass sensor data, a first azimuth is calculated from the first magnetic compass measurement result of the first magnetic compass A4, and a second azimuth is calculated from the second magnetic compass measurement result of the second magnetic compass B4. Furthermore, a reference azimuth may be calculated from the IM sensor data, i.e. from one of the IM measurement results. Next, the first azimuth is compared to the reference azimuth to obtain a first difference, and the second azimuth is compared to the reference velocity to obtain a second difference. These two differences may be further compared with a predetermined reference threshold, e.g. 5 degrees or preferably 15 degrees. If the first difference is smaller than the reference threshold, the first magnetic compass measurement result is selected. Otherwise, if the first difference is greater than the reference threshold and the second difference is smaller than the reference threshold, the second magnetic compass measurement result is selected. Or, if both the first and second differences are bigger than the reference threshold, by default, the first magnetic compass measurement result may be used as the value of the magnetic compass sensor data for flight control of the UAV. In other words, unless the first difference is greater than the reference threshold and the second difference is smaller than the reference threshold, the first magnetic compass measurement result may be used as the value of the magnetic compass sensor data for flight control of the UAV.

From the foregoing, it can be seen that the IM sensor data may be frequently used to determine various other types of sensor data, because the IM measurement results may include may aspects or parameters of the flight status of the UAV. Thus, in some embodiments, the sensor data of the IM sensors A1 and B1 may be determined firstly. In some preferred embodiments, the sensor data of the inertial measurement sensors A1 and B1, the sensor data of the barometers A2 and B2, the sensor data of the positioning sensors A3 and B3 and the sensor data of the magnetic compass A4 and B4 can be determined sequentially.

It can be appreciated by those skilled in the art that the method shown in FIG. 2 and the processes described with reference to FIGS. 3-6 can be implemented by the flight monitoring system 100 shown in FIG. 1 or any other flight control systems with two sets of flight-status detecting sensors.

Compared with conventional systems, the flight monitoring system and method according to the embodiments of the present application is low in cost, and does not take up more space and weight of the UAV. Furthermore, the flight monitoring system and method successfully determine the value of sensor data of various sensors even if conflict occurs between the measurement results of the sensors of the same type, which significantly improves the reliability of the flight monitoring system, as well as the safety of the UAVs employing such system.

The embodiments of the present application may be implemented by hardware, software or any combination thereof. The hardware may be implemented by specific logic circuits, and the software may be stored in a memory and executed by appropriate instruction executing systems. For example, the software may be executed by a microprocessor or a specifically designed hardware. Those skilled in the art may understand that the previous method of the present application may be implemented by computer-executable instructions and/or control codes contained in the processor. For example, such codes may be provided in storage mediums such as hard disks, programmable memories such as ROM(s), or data mediums such as optical or electrical signal mediums.

Those skilled in the art may understand and implement other variations to the disclosed embodiments from a study of the drawings, the present application, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A flight monitoring system for an unmanned aerial vehicle (UAV), comprising: a first set of flight-status detecting sensors comprising:
   a first-type sensor A1 for providing a first-type measurement result; and
   a second-type sensor A2 for providing a second-type measurement result;
   a second set of flight-status detecting sensors comprising:
   a first-type sensor B1 for providing a first-type measurement result; and
   a second-type sensor B2 for providing a second-type measurement result; and
   a control module coupled to the first and second sets of flight-status detecting sensors to receive the measurement results therefrom, wherein the control module is configured to:
   compare a difference between the first-type measurement results from the first-type sensor A1 and the first-type sensor B1 with a first predetermined threshold;
   decide a first-type sensor data of the first-type sensors as indefinite if the difference is more than the first predetermined threshold;
   determine a value of the first-type sensor data by selecting one of the first-type measurement results from the first-type sensor A1 and the first-type sensor B1 as the value of the first-type sensor data according to the second-type measurement results; set and setting the first-type sensor data as definite after the selection; and determine the value of the first-type sensor data of the first-type sensors even if a conflict occurs between the first-type measurement results of the first-type sensors, in order to improve the reliability and safety of the flight monitoring system and the unmanned aerial vehicle.

2. The flight monitoring system of claim 1, wherein the control module is configured to select the first-type measurement result from either the first-type sensor A1 or the first-type sensor B1 as the value of the first-type sensor data, if the difference between the first-type measurement results from the first-type sensor A1 and the first-type sensor B1 is equal to or less than the first predetermined threshold.

3. The flight monitoring system of claim 1, wherein the control module comprises:
   a primary controller coupled to the first set of fight-status detecting sensors; and
   a secondary controller coupled to the second set of flight-status detecting sensor and the primary controller;
   wherein one or both of the primary controller and the secondary controller is further configured to determine the validity of the measurement results from the first and second sets of flight-status detecting sensors, and select the first-type measurement result from the first-type sensor A1 as the value of the first-type sensor data if the difference between the first-type measurement results from the first-type sensor A1 and the first-type sensor B1 is equal to or less than the first predetermined threshold.

4. The flight monitoring system of claim 1, wherein the control module is further configured to:
   selecting one of the second-type measurement results from the second-type sensor A2 and the second-type sensor B2 to be used for said selection of one of the first-type measurement results as the value of the first-type sensor data.

5. The flight monitoring system of claim 1, wherein the control module is further configured to determine the validity of the first-type measurement results from both the first-type sensor A1 and the first-type sensor B1, and to perform the operations of comparing, deciding and determining the value of the first-type sensor if both of the first-type measurement results are valid.

6. The flight monitoring system of claim 1, wherein the first set of flight-status detecting sensors further comprises:
   a third-type sensor A3 for providing a third-type measurement result, and the second set of flight-status detecting sensors further comprises:
   a third-type sensor B3 for providing a third-type measurement result; and wherein the control module is further configured to perform:
   comparing a difference between the third-type measurement results from the third-type sensor A3 and the third-type sensor B3 with a third predetermined threshold;
   deciding a third-type sensor data of the third-type sensors as indefinite if the difference is more than the third predetermined threshold; and
   selecting one of the third-type measurement results from the third-type sensor A3 and the third-type sensor B3 as the value of the third-type sensor data according to the first-type sensor data, and setting the third-type sensor data as definite after the selection.

7. A method for monitoring flight of an unmanned aerial vehicle (UAV) using a control module comprising the steps of:
   detecting a flight status of the UAV using a first set of flight-status detecting sensors comprising a first-type sensor A1 and a second-type sensor A2, wherein the first-type sensor A1 provides a first-type measurement result and the second-type sensor A2 provides a second-type measurement result;
   detecting the flight status of the UAV using a second set of flight-status detecting sensors comprising a first-type sensor B1 and a second-type sensor B2, wherein the first-type sensor B1 provides a first-type measurement result and the second-type sensor B2 provides a second-type measurement result;
   comparing a difference between the first-type measurement results from the first-type sensor A1 and the first-type sensor B1 with a first predetermined threshold;
   deciding a first-type sensor data of the first-type sensors as indefinite if the difference is more than the first predetermined threshold; determining a value of first-type sensor data by selecting one of the first-type measurement results from the first-type sensor A1 and the first-type sensor B1 as the value of the first-type sensor data according to the second-type measurement results; setting the first-type sensor data as definite after the selection; and determining the value of the first-type sensor data of the first-type sensors even if a conflict occurs between the first-type measurement results of the first-type sensors, in order to improve the reliability and safety of the unmanned aerial vehicle.

8. The method of claim 7, wherein the method further comprises:
   selecting the first-type measurement result from either the first-type sensor A1 or the first-type sensor B1 as the value of the first-type sensor data, if the difference between the first-type measurement results from the first-type sensor A1 and the first-type sensor B1 is equal to or less than the first predetermined threshold.

9. The method of claim 7, wherein the step of selecting one of the first-type measurement results from the first-type sensor A1 and the first-type sensor B1 as the value of the first-type sensor data according to the second-type measurement results comprises:
   selecting one of the second-type measurement results from the second-type sensor A2 and the second-type sensor B2 to be used for said selection of one of the first-type measurement results as the value of the first-type sensor data.

10. The method of claim 7, wherein the first set of flight-status detecting sensors further comprises a third-type sensor A3 for providing a third-type measurement result, and the second set of flight-status detecting sensors further comprises a third-type sensor B3 for providing a third-type measurement result; and the method further comprises:
    comparing a difference between the third-type measurement results from the third-type sensor A3 and the third-type sensor B3 with a third predetermined threshold;
    deciding a third-type sensor data of the third-type sensors as indefinite if the difference is more than the third predetermined threshold; and
    selecting one of the third-type measurement results from the third-type sensor A3 and the third-type sensor B3 as the value of the third-type sensor data according to the first-type sensor data, and setting the third-type sensor data as definite after the selection.

11. The method of claim 7, wherein the first-type sensors are inertial measurement sensors and the second-type sensors are positioning sensors, or the first-type sensors are positioning sensors and the second-type sensors are inertial measurement sensors, and wherein the selecting step further comprises:
    determining a first velocity from the first-type measurement result of the first-type sensor A1 and a second velocity from the first-type measurement result of the first-type sensor B1;
    determining a reference velocity from the second-type measurement results; and determining a first difference between the first velocity and the reference velocity, and a second difference between the second velocity and the reference velocity; and selecting the first-type measurement result of the first-type sensor A1 as the value of the first-type sensor data for flight control of the UAV, unless the first difference is greater than a reference threshold and the second difference is smaller than the reference threshold.

12. The method of claim 7, wherein the first-type sensors are inertial measurement sensors and the second-type sensors are barometers, or the first-type sensors are barometers and the second-type sensors are inertial measurement sensors or positioning sensors, or the first-type sensors are positioning sensors and the second-type sensors are barometers, and wherein the selecting step further comprises:

determining a first vertical speed from the first-type measurement result of the first-type sensor A1 and a second vertical speed from the first-type measurement result of the first-type sensor B1;

determining a reference vertical speed from the second-type measurement results; and determining a first difference between the first vertical speed and the reference vertical speed, and a second difference between the second vertical speed and the reference vertical speed; and selecting the first-type measurement result of the first-type sensor A1 as the value of the first-type sensor data for flight control of the UAV, unless the first difference is greater than a reference threshold and the second difference is smaller than the reference threshold.

13. The method of claim 7, wherein the first-type sensors are inertial measurement sensors and the second-type sensors are magnetic compasses, or the first-type sensors are magnetic compasses, and the second-type sensors are inertial measurement sensors, and wherein the selecting step further comprises:

determining a first azimuth from the first-type measurement result of the first-type sensor A1 and a second azimuth from the first-type measurement result of the first-type sensor B1;

determining a reference azimuth from the second-type measurement results; and determining a first difference between the first azimuth and the reference azimuth, and a second difference between the second azimuth and the reference azimuth; and selecting the first-type measurement result of the first-type sensor A1 as the value of the first-type sensor data for flight control of the UAV, unless the first difference is greater than a reference threshold and the second difference is smaller than the reference threshold.

14. The method of claim 7, wherein prior to the operation of comparing, the method further comprises:

determining the validity of the first-type measurement results from both the first-type sensor A1 and the first-type sensor B1; and if both of the first-type measurement results are valid, continuing the operation of comparing.

15. A method for monitoring flight of an unmanned aerial vehicle (UAV) using a control module comprising the steps of:

detecting a flight status of the UAV using a first set of flight-status detecting sensors comprising a first inertial measurement sensor A1, a first barometer A2, a first positioning sensor A3 and a first magnetic compass A4;

detecting the flight status of the UAV using a second set of flight-status detecting sensors comprising a second inertial measurement sensor B1, a second barometer B2, a second positioning sensor B3 and a second magnetic compass B4;

identifying whether a sensor data of each type of flight-status detecting sensors is definite; determining a value of the sensor data of a type of flight-status detecting sensors using the sensor data of at least one another type of flight-status detecting sensors;

setting the sensor data of the type of flight-status detecting sensors as definite after the determination; and determining the value of sensor data of the flight-status detecting sensors even if a conflict occurs between the measurement results of the flight-status detecting sensors of the same type, in order to improve the reliability and safety of the unmanned aerial vehicle.

16. The method of claim 15, wherein the sensor data of the inertial measurement sensors A1 and B1, the sensor data of the barometers A2 and B2, the sensor data of the positioning sensors A3 and B3 and the sensor data of the magnetic compass A4 and B4 are determined sequentially.

17. The method of claim 15, wherein the determining step further comprises:

determining the sensor data of the inertial measurement sensors using the sensor data of the positioning sensors, if the sensor data of the positioning sensors is definite;

determining the sensor data of the inertial measurement sensors using the sensor data of the barometers, if the sensor data of the positioning sensors is indefinite and the sensor data of the barometers is definite; and determining the sensor data of the inertial measurement sensors using the sensor data of the magnetic compass, if the sensor data of the positioning sensors is indefinite, the sensor data of the barometers is indefinite and the sensor data of the magnetic compass is definite.

18. The method of claim 15, wherein the determining step further comprises:

determining the sensor data of the barometers using the sensor data of the inertial measurement sensors, if the sensor data of the inertial measurement sensors is definite; and determining the sensor data of the barometers using the sensor data of the positioning sensors, if the sensor data of the inertial measurement sensors is indefinite and the sensor data of the positioning sensors is definite.

19. The method of claim 15, wherein the determining step further comprises:

determining the sensor data of the positioning sensors using the sensor data of the inertial measurement sensors, if the sensor data of the inertial measurement sensors is definite; and determining the sensor data of the positioning sensors using the sensor data of the barometers, if the sensor data of the inertial measurement sensors is indefinite and the sensor data of the barometers is definite.

20. The method of claim 15, wherein the determining step further comprises: determining the sensor data of the magnetic compass using the sensor data of the inertial measurement sensors.

* * * * *